Patented Aug. 7, 1928.

1,680,066

UNITED STATES PATENT OFFICE.

FRITZ ROTHE, OF AACHEN, AND HANS BRENEK, OF PORZ, NEAR COLOGNE, GERMANY, ASSIGNORS TO THE FIRM RHENANIA VEREIN CHEMISCHER FABRIKEN A. G., OF COLOGNE, GERMANY.

PROCESS FOR OBTAINING PURE ALUMINA AND ALKALI-METAL CARBONATES.

No Drawing. Application filed October 6, 1925, Serial No. 60,922, and in Germany October 13, 1924.

It is known that by heating substances containing alumina as for example bauxite, with alkali-metal chlorides or sulphates, soda or potash and pure alumina can be obtained.

The processes in question have not, however, received industrial application. The reason for this is probably that the carrying out of the processes is very difficult and necessitates a very complicated plant and that very considerable excesses of alumina are necessary for the decomposition of the alkali-metal sulphate.

We have found that it is possible to convert the alumina in alumina-containing substances (bauxite, hydrogillite, diaspore, clay and others) almost quantitatively into aluminate by heating to incandescence with alkali-metal sulphates, if the heating of the mixture containing the said initial substances is carried out in a current of gas, as air, furnace gases or the like, in the presence of steam, using for this purpose temperatures of about 1100° C. or over.

We have also found that by adopting the aforesaid measures it is unnecessary to employ alumina in the considerable excesses used in the known process in which up to 2.3 mols of $Al_2O_3$ are employed for every mol of $Na_2O$. In the present case it is sufficient to use for very mol of $Al_2O_3$ about 1 mol alkali-metal oxide in the form of alkali-metal sulphates, this ratio being the same as that used in the known Le Chatelier's process, in which alkali-metal oxide in the form of soda is employed.

In the case of alumina minerals rich in silica there are added to the raw mixture consisting of alumina mineral and alkali-metal sulphate such quantities of calcium in the form of quicklime, calcium hydroxide, or salts of calcium that 2 mols CaO go to every mol of $SiO_2$ for the purpose of converting the silica into an insoluble compound.

The product obtained is a porous loose mass which may be easily comminuted and extracted with water. From the aluminate extract obtained the alumina can be obtained in the known manner either by separation by means of carbon dioxide or by churning according to the Bayer process, sodium carbonate or caustic soda being obtained as a by-product according to the process employed.

The gases containing sulphurous acid resulting from the decomposition are utilized in the known manner.

Particularly advantageous for carrying out the decomposition process is the use of a revolving tube furnace which is fed with the raw material mixture in the form of a powder and is heated by producer gas, oil, or coal dust, the quantity of steam necessary for the decomposition being passed into the furnace gases. The mixture of raw materials can, however, be subjected in the form of briquettes to the furnace gases in annular kilns in the presence of steam. In either case it is advantageous to conduct the heating in an oxidizing manner.

The following are examples of this process:—

1. 100 parts of a French bauxite containing 55% $Al_2O_3$ and 3% $SiO_2$ are intimately mixed with 82 parts of sodium sulphate and 5.5 parts of calcium carbonate (for combining with the silica) and heated to incandescence at 1180° C. in a revolving tube furnace heated with gas, steam being passed in at the same time. The sintered loose product obtained gives, in the case of a total alumina content of 40.96%, 40.02% of $Al_2O_3$, corresponding to a decomposition of approximately 98% of the alumina employed.

2. 100 parts of the same bauxite are briquetted with 5.5 parts of calcium carbonate and 105 parts of potassium sulphate, heated electrically in a muffle at 1150° C. into which air and steam are passed.

The sintered product shows a decomposition of 92% of the alumina employed.

What we claim and desire to secure by Letters Patent of the United States is:—

1. The process which consists in mixing minerals containing alumina with an alkali-metal sulphate and heating said mixture to incandescence in the presence of steam at a temperature of at least 1100° C. avoiding any reduction in the mixture during the process.

2. The process which consists in mixing minerals containing alumina with an alkali-metal sulphate and heating said mixture to incandescence in an oxidizing atmosphere and in the presence of steam at a temperature of at least 1100° C.

3. The process which consists in mixing minerals containing alumina and being rich in silica with an alkali-metal sulphate and lime in sufficient proportion to convert the silica in the alumina-containing minerals into calcium orthosilicate, and heating said mixture to incandescence in the presence of steam at a temperature of at least 1100° C. avoiding any reduction in the mixture during the process.

4. The process which consists in mixing minerals containing alumina with such quantities of an alkali-metal sulphate that about 1 mol of the alkali-metal oxide is used to 1 mol of alumina, and heating said mixture to incandescence in the presence of steam at a temperature of at least 1100° C. avoiding any reduction in the mixture during the process.

5. The process which consists in mixing minerals containing alumina and being rich in silica with such quantities of an alkali-metal sulphate that about 1 mol of the alkali-metal oxide is used to 1 mol of alumina and lime in sufficient proportion to convert the silica in the alumina-containing minerals into calcium orthosilicate, and heating said mixture to incandescence in the presence of steam at a temperature of at least 1100° C. avoiding any reduction in the mixture during the process.

6. The process which consists in mixing minerals containing alumina with an alkali-metal sulphate and heating said mixture in the presence of steam in a revolving tube furnace at a temperature of at least 1100° C. avoiding any reduction during the process.

7. The process which consists in mixing minerals containing alumina with an alkali-metal sulphate, placing said mixture in the form of powder in a revolving tube furnace and heating it by suitable means, as furnace gases, to which is added the steam required for the reaction at a temperature of at least 1100° C. avoiding any reduction in the mixture during the process.

8. The process which consists in mixing bauxite with an alkali-metal sulphate and heating said mixture to incandescence in the presence of steam at a temperature of at least 1100° C. avoiding any reduction in the mixture during the process.

In testimony whereof we affix our signatures.

DR. FRITZ ROTHE.
DR. HANS BRENEK.